US006759073B2

(12) United States Patent
Heisey et al.

(10) Patent No.: US 6,759,073 B2
(45) Date of Patent: Jul. 6, 2004

(54) COMPOSITIONS AND METHODS FOR STABILIZATION AND ENHANCED VISCOSITY

(75) Inventors: Matthew Thomas Heisey, Wyoming, OH (US); Raul Victorino Nunes, Loveland, OH (US); Galen Edward Downton, Fairfield, OH (US)

(73) Assignee: The Procter & Gamble Co., Cincinnati, OH (US)

(*) Notice: Subject to any disclaimer, the term of this patent is extended or adjusted under 35 U.S.C. 154(b) by 272 days.

(21) Appl. No.: 10/014,980

(22) Filed: Dec. 11, 2001

(65) Prior Publication Data

US 2003/0035880 A1 Feb. 20, 2003

Related U.S. Application Data

(60) Provisional application No. 60/302,433, filed on Jul. 2, 2001.

(51) Int. Cl.[7] .................................................. A23L 1/05
(52) U.S. Cl. ........................ 426/573; 426/575; 426/577; 426/578
(58) Field of Search .................... 426/573, 578, 426/577, 575

(56) References Cited

U.S. PATENT DOCUMENTS

| | | | |
|---|---|---|---|
| 3,057,734 A | | 10/1962 | Pader |
| 3,558,768 A | | 1/1971 | Klippel |
| 3,658,552 A | | 4/1972 | Carlson et al. |
| 4,187,326 A | | 2/1980 | Serafino et al. |
| 4,276,311 A | | 6/1981 | Burrows et al. |
| 4,400,405 A | * | 8/1983 | Morley et al. ............... 426/565 |
| 4,400,406 A | * | 8/1983 | Morley et al. ............... 426/565 |
| 4,504,504 A | | 3/1985 | Gaehring et al. |
| 4,529,613 A | | 7/1985 | Mezzino et al. |
| 4,612,204 A | | 9/1986 | Huffman |
| 4,619,883 A | | 10/1986 | Anderson et al. |
| 4,737,374 A | * | 4/1988 | Huber et al. ................. 426/565 |
| 5,356,654 A | | 10/1994 | Speirs et al. |
| 5,385,748 A | | 1/1995 | Bunger et al. |
| 5,498,702 A | | 3/1996 | Mitchell et al. |
| 5,529,796 A | | 6/1996 | Gobbo et al. |
| 5,538,751 A | * | 7/1996 | Carter et al. ................. 426/661 |
| 5,571,334 A | | 11/1996 | Dunn et al. |
| 5,576,039 A | | 11/1996 | Lewis |
| 5,641,532 A | * | 6/1997 | Pflaumer et al. ............ 426/590 |
| 5,656,734 A | | 8/1997 | Ehrlich |
| 5,676,066 A | * | 10/1997 | Cavalier et al. ............ 108/55.1 |
| 5,789,004 A | * | 8/1998 | Hogan et al. ................. 426/96 |
| 5,853,761 A | | 12/1998 | Kumabe et al. |
| 5,866,190 A | | 2/1999 | Barey |
| 6,099,876 A | | 8/2000 | Nussinovitch |
| 6,610,336 B2 | * | 8/2003 | Poorman ..................... 426/100 |

FOREIGN PATENT DOCUMENTS

| | | |
|---|---|---|
| CN | 1110535 A | 10/1995 |
| EP | 0 146 904 A2 | 7/1985 |
| EP | 0 336 894 A1 | 10/1989 |
| EP | 0 512 855 A2 | 11/1992 |
| EP | 0 639 335 B1 | 6/1998 |
| EP | 0 853 888 A1 | 7/1998 |
| GB | 915 389 | 1/1963 |
| GB | 2 087 212 A | 5/1982 |
| JP | 11056315 | 3/1999 |
| WO | WO 93/08704 | 5/1993 |
| WO | WO 97/39170 | 10/1997 |
| WO | WO 99/37685 | 7/1999 |
| WO | WO 00/08952 | 2/2000 |

OTHER PUBLICATIONS

U.S. patent application Ser. No. 10/014,377, Nunes, et al., filed Dec. 11, 2001.
U.S. patent application Ser. No. 10/014,364, Nunes, et al., filed Dec. 11, 2001.

* cited by examiner

Primary Examiner—Carolyn Paden
(74) Attorney, Agent, or Firm—S. Robert Chuey; Kelly McDow-Dunham; Carl Roof

(57) ABSTRACT

The present invention relates to compositions which are useful as stabilizer and thickener systems, as well as methods of their use. The compositions are useful as, for example, cosmetic, health care (including pharmaceutical and over-the-counter compositions), food, and beverage compositions, preferably food and beverage compositions. The present invention is further directed to methods of stabilizing such compositions. The compositions comprise a pectin compound, an alginate compound, a cellulose compound such as carboxymethylcellulose.

27 Claims, No Drawings

COMPOSITIONS AND METHODS FOR STABILIZATION AND ENHANCED VISCOSITY

REFERENCE TO PRIORITY APPLICATION

The present invention claims priority to U.S. Provisional Application Serial No. 60/302,433, filed Jul. 2, 2001.

FIELD OF THE INVENTION

The present invention relates to compositions which are useful as stabilizer and thickener systems, as well as methods of their use. The compositions are useful as, for example, cosmetic, health care (including pharmaceutical and over-the-counter compositions), food, and beverage compositions, preferably food and beverage compositions. The present invention is further directed to methods of stabilizing such compositions.

BACKGROUND OF THE INVENTION

Stability is a critical parameter for compositions which comprise one or more materials such as, for example, opacifiers and nutrients. In an unstable composition, changes may occur over time which result in, for example, one or more of the following:

1) Separation of layers (phase separation), wherein the layers have different colors and/or densities; and
2) Increases in particle size of the material (e.g., flocculation or aggregation).

In such unstable compositions, the material may settle to the bottom of a container which holds the composition, which results in a "caking" formation (i.e., phase separation), float to the top of the container (for example, wherein the material is an oil), or otherwise separate. See e.g., Meunier and Mengual, "A New Concept in Stability Analysis of Concentrated Colloidal Dispersions (Emulsions, Suspensions, Foams, Gels)", $4^{th}$ World Surfactant Congress, Vol. 4, pp. 300–314 (1996).

Accordingly, stability of compositions is critically important since the materials thereof may provide benefits such as, for example, opacity or cloud (e.g., for the purpose of providing a desired appearance) and nutrition or other efficacious benefits. Wherein materials (which would normally deliver one or more of these benefits) are not stable in the corresponding composition, these benefits will be lost. For example, a composition exhibiting noticeable flocculation will be unpalatable and unattractive to the consumer. Additionally, a composition comprising a vitamin or mineral intended for ingestion will be less nutritive for the consumer wherein such vitamins and minerals are not stable in the composition (i.e., such vitamins and minerals will settle and not be ingested, or ingested at a decreased dosage). Therefore, it is critically important to provide stable compositions comprising materials such that the benefits of the materials are provided to the consumer.

Barey, U.S. Pat. No. 5,866,190, assigned to Systems Bio-Industries, issued Feb. 2, 1999, discloses compositions used for stabilizing non-milk, acidic beverages. The compositions comprise a specific composition of pectin and alginate. As disclosed therein, stability of exemplified compositions is measured upon a relatively short period of time, i.e., 50 days. Additionally, there is no disclosure of materials which provide the requisite viscosity for acceptability of the final composition. Additionally, the reference fails to disclose the stabilization of insoluble materials, e.g., insoluble vitamins and particles.

However, failures of previously described systems containing pectin and alginate have prompted the need for further research in the field. Excitingly, the present inventors herein have discovered that defined combinations of pectin and alginate can stabilize, for example, oils and/or dense and/or large particles (i.e., particles having a density of from about 1 to about 5 or a particle size greater than about 0.2 microns), over extended periods of time, e.g., at least about 75 days. As is taught herein, it has been found that such enhanced stability of these dense, large particles is critically dependent upon manipulation of pectin to alginate ratios and/or total pectin/alginate concentrations in the composition.

It has further been surprisingly discovered that a thickener can be included within these stabilizing systems. The thickener is unexpectedly compatible with the structure by providing additional viscosity to the finished product without disrupting or destabilizing such network. This is a critically important discovery, as viscosity is often a key feature of the finished composition, particularly in beverage compositions. In many cases, it has been discovered that up to a three-fold increase in viscosity can be achieved without compromising the three-dimensional stabilizing network. Additionally, it has been discovered that the total concentration of the stabilizing system can be decreased upon addition of the thickener herein, providing for increased efficiency of the stabilizing process and lower overall cost to the consumer of the product.

SUMMARY OF THE INVENTION

The present invention relates to compositions useful for providing stability to a finished product, e.g., a cosmetic, food, beverage, pharmaceutical, or over-the-counter health care product. The compositions herein comprise:

(a) a stabilizer system comprising a pectin compound and an alginate compound; and
(b) a cellulose compound.

Without intending to be limited by theory, the present inventors have surprisingly discovered that these select compositions provide enhanced stability of suspended materials through provision of a three-dimensional network formed by the pectin compound and the alginate compound. The present inventors have further discovered that the thickeners herein provided added viscosity to the composition, surprisingly without disrupting the network provided by the pectin compound and the alginate compound. Accordingly, the compositions provide both stability and viscosity without compromising the efficiency of either of these properties.

The present invention further relates to methods of stabilizing a product comprising incorporating into the product a composition as described herein.

DETAILED DESCRIPTION OF THE INVENTION

The present invention relates to compositions useful for providing stability to a finished composition, e.g., cosmetic, health care (including pharmaceutical and over-the-counter compositions), food, and beverage compositions, preferably food and beverage compositions, and most preferably beverage compositions. The present invention is also directed to methods of their use.

Publications and patents are referred to throughout this disclosure. All references cited herein are hereby incorporated by reference.

All percentages are calculated by weight unless otherwise indicated. All percentages are calculated based on the total composition unless otherwise indicated.

All component or composition levels are in reference to the active level of that component or composition, and are exclusive of impurities, for example, residual solvents or by-products, which may be present in commercially available sources.

Referred to herein are trade names for components including, but not limited to, pectin compounds, alginate compounds, thickeners, and other optional components. The inventors herein do not intend to be limited by materials under a certain trade name. Equivalent materials (e.g., those obtained from a different source under a different name or catalog (reference) number) to those referenced by trade name may be substituted and utilized in the compositions and methods herein.

In the description of the invention various embodiments and/or individual features are disclosed. As will be apparent to the ordinarily skilled practitioner, all combinations of such embodiments and features are possible and can result in preferred executions of the present invention.

The products herein may comprise, consist essentially of, or consist of any of the elements as described herein.

Definitions

As used herein, the symbol "$\mu m$" means micron, as is commonly understood in the art.

As used herein, density is expressed in $g/cm^3$, as is commonly understood in the art.

As used herein, the terms "opacity" and "cloud" are synonymous. As one of ordinary skill will appreciate, the term "opacity" is most often utilized in, for example, paper industries. The term "cloud" is most often utilized in, for example, food and beverage industries. For simplicity, "opacity" and "cloud" may be interchanged herein without change in meaning.

The Compositions of the Present Invention

The compositions herein comprise:
(a) a stabilizer system comprising a pectin compound and an alginate compound; and
(b) a cellulose compound.

The present inventors have surprisingly discovered that these select compositions provide enhanced stability of suspended materials, for example, materials such as nutrients (including, for example, vitamins and minerals) and/or opacifying agents in a finished product. Without intending to be limited by theory, the present inventors have discovered that combination of the pectin compound and the alginate compound provide a unique three-dimensional network to support, for example, the materials described herein. The thickener is unexpectedly compatible with the structure by providing additional viscosity to the finished product without disrupting or destabilizing such network. Accordingly, the present compositions provide surprisingly enhanced stability and added viscosity to finished products relative to those currently known in the art. Indeed, the compositions provide both stability and viscosity without compromising the efficiency of either of these properties. The compositions, therefore, allow the control of support of the materials, viscosity, and texture (which is particularly important for food and beverage products).

The Pectin Compound

As is commonly known in the art, and as used herein, pectin compounds are any of a group of carbohydrate derivatives of plant origin containing a large proportion (i.e., typically at least about 50%, more preferably at least about 65%) of units derived from galacturonic acid and subdivided into protopectins, pectins, pectinic acids, and pectic acids. Preferably, the pectin compound utilized in the present invention is a polyanhydrogalacturonic acid macromolecule made up of galacturonic acid units and having the following structure:

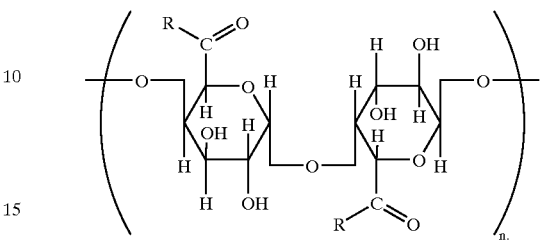

wherein n is an integer representing the number of repeating monomer units. Two monomer units ("units") are explicitly depicted in the above structure.

For non-amidated pectin compounds, R is selected from hydroxy (—OH) and methoxy (—OCH$_3$). For amidated pectin compounds, R is selected from hydroxy (—OH), methoxy (—OCH$_3$), and amino (—NH$_2$). In any given pectin compound, each "R" of a unit may be independently different from any other "R" of the same pectin compound. Therefore, wherein R is —OH for one unit, R may be —OH, —OCH$_3$, or —NH$_2$ (depending upon whether the compound is non-amidated or amidated) for every other unit of the same pectin compound.

The pectin compounds utilized in the compositions of the present invention are preferably non-amidated pectin compounds.

The degree of esterification (as used herein and as commonly known, "DE") is variable for pectin compounds; wherein a pectin compound is esterified at least one unit thereof has R as —OCH$_3$ for a given galacturonic acid unit. The degree of esterification is therefore defined as the number of esterified galacturonic acid units expressed in percentages of all the galacturonic acid units in the molecule (and thus having a value between 0% and 100%). Preferred pectin compounds are lightly methylated, i.e., having less than about 50% (i.e., less than about 50% DE), more preferably between about 25% and 50% of the galacturonic acid units of the pectin compound esterified (i.e., from about 25% to about 50% DE). Non-limiting examples of such lightly methylated pectin compounds are set forth in Marr et al., WO 99/37685, assigned to Hercules Inc., published Jul. 29, 1999. Other preferred pectin compounds are highly methylated, i.e., having about 50% or more of the galacturonic units of the pectin compound esterified (i.e., about 50% or more DE). Non-limiting examples of such methylated pectin compounds are set forth in Barey, U.S. Pat. No. 5,866,190, assigned to Systems Bio-Industries, issued Feb. 2, 1999.

Wherein amidated pectin compounds are utilized in the present invention, such amidated pectin compounds preferably have a degree of amidation of less than about 25% (i.e., less than about 25% of the galacturonic acid units of the pectin compound have R as —NH$_2$).

Methylated pectin compounds are commercially available from a variety of sources including, for example, SKW Bio-Systems, Boulogne, France, Hercules, Inc., Wilmington, Del., and Danisco. Non-limiting examples of useful pectin compounds include, but are not limited to, UNIPECTINE RS 150, UNIPECTINE 3450 NA 95, UNIPECTINE 150° SAG, UNIPECTINE RS ND, UNIPEC- TINE SS 150, UNIPECTINE OB700, UNIPECTINE OB800, and UNIPECTINE OF 700, all of which are commercially available from SKW Bio-Systems, Boulogne, France. Other non-limiting examples of useful pectin compounds include, but are not limited to, GENU Pectin Type VIS, Pectin JM, GENU Pectin 150 Grade USA-SAG Type BB Rapid Set, and GENU Pectin 150 Grade USA-SAG Type DD Slow Set, all of which are commercially available from Hercules, Inc., Wilmington, Del. Another non-limiting example of a useful pectin compound is commercially available as Pectin AMD 780, from Danisco.

The Alginate Compound

As is commonly known in the art, and as used herein, the alginate compounds herein are polysaccharides which are formed from units of beta-1,4-D-mannuronic acid and alpha-1,4-L-guluronic acid. Such units have the following structures:

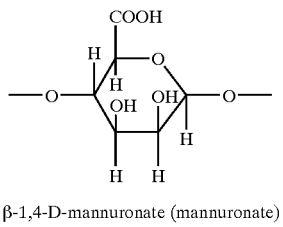

β-1,4-D-mannuronate (mannuronate)

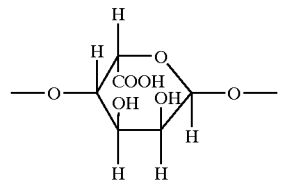

α-1,4-L-guluronate (guluronate)

The units of the alginate compound may be arranged in any manner, i.e., in random or block arrangement.

Any alginate compound may be utilized in the compositions of the present invention. For example, the alginate compound may be a naturally occurring alginate compound (naturally occurring alginates may, for example, be derived from seaweed). As used herein, the term "naturally occurring" with respect to the alginate compound means that the alginate compound utilized is found in nature or is prepared synthetically, but chemically equivalent to an alginate compound found in nature. Other alginate compounds which may be utilized include those which are derivatives of naturally occurring alginates, for example, a propylene glycol alginate. Preferably, the alginate compound utilized herein is a naturally occurring alginate.

Preferably, the alginate compound is low in mannuronic acid units relative to guluronic acid units. Specifically, the ratio (by number of units, not by weight of units) of mannuronic acid units to guluronic acid units is preferably less than about 1, more preferably from about 0.1 to about 0.9, and most preferably from about 0.1 to about 0.5.

A preferred alginate compound for use in the present compositions is sodium alginate. Sodium alginate is commercially available from a variety of sources including, for example, as SALTIALGINE GS 300, commercially available from SKW Bio-Systems, Boulogne, France, which is a preferred alginate compound for use in the present invention. Other useful alginate compounds include SALTIALGINE S1100X, SALTIALGINE S 20, SALTIALGINE S 170, and SALTIALGINE S 300, all of which are also commercially available from SKW Bio-Systems.

Additionally, NutraSweet Kelco Company supplies numerous alginate compounds including, for example, those in the KELGIN series, MANUCOL series, KELVIS series, KELCOSOL series, KELTONE series, MANUGEL series, KELMAR series, KELCOLOID series, KELSET series, LACTICOL series, ALGINADE series, DARILOID series, MARLOID series, and SHERBELIZER series.

The Pectin Compound/Alginate Compound Combination

Without intending to be limited by theory, the present inventors have discovered that combination of the pectin compound and the alginate compound provides a unique three-dimensional network to support, for example, the materials described herein, for example, nutrients (including, for example, vitamins and/or minerals), opacifiers, and/or materials which are normally insoluble in water at nearly neutral to acidic pH. In doing so, the present inventors have discovered that it is preferred to utilize certain pectin compounds in association with certain alginate compounds, and certain ratios of the pectin compound to the alginate compound. Additionally, the present inventors have discovered that the total amount of pectin compound and alginate compound in the final composition contributes to the performance of the composition as a stabilizer in, for example, food or beverage compositions.

It is preferred to utilize a ratio of the pectin compound to the alginate compound of from about 0.1 to about 3, more preferably from about 0.1 to about 0.9, still more more preferably from about 0.2 to about 0.8, even more preferably from about 0.2 to about 0.6, and most preferably from about 0.2 to about 0.4. As used herein, such ratios are calculated by weight (rather than moles) of the pectin compound and the alginate compound according to the following formula:

Pectin-to-Alginate Ratio=Amount of Pectin in the Composition (by weight)/Amount of Alginate in the Composition (by weight)

wherein in the formula, the symbol "/" means "divided by", as is commonly understood.

Moreover, the present inventors having surprisingly discovered that the total weight percent of pectin compound and alginate compound in the composition controls the ability of the composition to stabilize components such as, for example, the materials described herein. The pectin compounds and alginate compounds herein are, collectively (i.e., the total weight percent of pectin compound and alginate compound in the composition), typically utilized in the present compositions at levels from about 0.00001% to about 99.99999%, preferably from about 0.0001% to about 3%, more preferably from about 0.01% to about 0.1%, and most preferably from about 0.03% to about 0.07%.

Even further, the present inventors have discovered a direct correlation between the ratio of pectin compound to alginate compound and the total weight percent of the pectin compound and the alginate compound utilized in the composition. It has been discovered that such correlation has direct bearing on the optimized stability of the composition. For example, it has been discovered that wherein the ratio of pectin compound to alginate compound is relatively low, i.e., from about 0.1 to about 0.4, a relatively high total weight percent of pectin compound and alginate compound should be utilized, i.e., from about 0.02% to about 0.08%, more preferably from about 0.04% to about 0.08% of pectin compound and alginate compound, most preferably from about 0.04% to about 0.05%, by weight of the composition. Additionally, wherein a relatively high ratio of pectin compound to alginate compound is utilized, i.e., from about 0.4 to about 0.9, a relatively low total weight percent of pectin compound and alginate compound should be utilized, i.e., from about 0.01% to about 0.06%, more preferably from about 0.03% to about 0.05% of pectin compound and alginate compound, by weight of the composition.

The following Table 1 sets forth non-limiting examples of compositions having particularly preferred ratios in combination with preferred total weight percent of pectin and alginate, optimized as discovered herein to provide stability of large, dense materials:

TABLE 1

| Example | Ratio of Pectin Compound to Alginate Compound* | Total Weight Percent of Pectin Compound and Alginate Compound in Composition |
|---|---|---|
| A | 0.2 | 0.05 wt % |
| B | 0.2 | 0.06 wt % |
| C | 0.2 | 0.07 wt % |
| D | 0.2 | 0.08 wt % |
| E | 0.3 | 0.04 wt % |
| F | 0.3 | 0.05 wt % |
| G | 0.3 | 0.06 wt % |
| H | 0.3 | 0.07 wt % |
| I | 0.3 | 0.08 wt % |
| J | 0.4 | 0.03 wt % |
| K | 0.4 | 0.04 wt % |
| L | 0.4 | 0.05 wt % |
| M | 0.4 | 0.06 wt % |
| N | 0.5 | 0.03 wt % |
| O | 0.5 | 0.04 wt % |
| P | 0.5 | 0.05 wt % |
| Q | 0.6 | 0.03 wt % |
| R | 0.6 | 0.04 wt % |
| S | 0.6 | 0.05 wt % |
| T | 0.7 | 0.03 wt % |
| U | 0.7 | 0.04 wt % |
| V | 0.8 | 0.03 wt % |
| W | 0.8 | 0.04 wt % |

*Calculated by weight (rather than moles) of the pectin compound and the alginate compound in the composition Additionally, it is preferred to utilize highly methylated pectin compounds with alginate compounds which are low in mannuronic acid units relative to guluronic acid units (as set forth above). Additionally, it is preferred that the ratio of total methylated galacturonic acid (MG) units (i.e., units having R as —OCH$_3$) of the pectin compound(s) in the composition to the total guluronic acid (G) units of the alginate compound(s) in the composition is from about 0.05 to about 0.8, more preferably from about 0.1 to about 0.7, even more preferably from about 0.2 to about 0.6, and most preferably from about 0.2 to about 0.5. As used herein, this particular ratio is calculated by number of units. For example, wherein the ratio of total methylated galacturonic acid units of the pectin compound in the composition to the total guluronic acid units of the alginate compound in the composition is 0.2, there are 2 methylated galacturonic acid units of the pectin compound(s) in the composition per every 10 guluronic acid units of the alginate compound(s) in the composition.

Even further, the present inventors have discovered a direct correlation between the ratio of methylated galacturonic acid units of the pectin compound to the guluronic acid units of the alginate compound and the total weight percent of pectin compound and alginate compound utilized in the composition. For example, wherein a relatively high total weight percent of pectin compound and alginate compound is utilized, i.e., from about 0.02% to about 0.08%, more preferably from about 0.04% to about 0.08% of pectin compound and alginate compound, by weight of the composition, it is most preferred to utilize a relatively low ratio of methylated galacturonic acid units of the pectin compound to the guluronic acid units of the alginate compound (e.g., a ratio of about 0.5 or less, more preferably a ratio of about 0.35 or less). Wherein a relatively low total weight percent of pectin compound and alginate compound is utilized, i.e., from about 0.01% to about 0.06%, more preferably from about 0.03% to about 0.05% of pectin compound and alginate compound, by weight of the composition, more varying ratios of methylated galacturonic acid units of the pectin compound to the guluronic acid units of the alginate compound provide desired stability of the finished product. Typically, however, wherein a relatively low total weight percent of pectin compound and alginate compound is utilized, the ratio of methylated galacturonic acid units of the pectin compound to the guluronic acid units of the alginate compound is at least about 0.2, most preferably at least about 0.3. The following Table 2 sets forth non-limiting examples of compositions having particularly preferred ratios combined with preferred total weight percent of pectin and alginate:

TABLE 2

| Example | Ratio of MG Units of the Pectin Compound(s) in the Composition to G Units of the Alginate Compound(s) in the Composition | Total Weight Percent of Pectin Compound and Alginate Compound in Composition |
|---|---|---|
| AA | 0.2 | 0.05 wt % |
| BB | 0.2 | 0.06 wt % |
| CC | 0.2 | 0.07 wt % |
| DD | 0.2 | 0.08 wt % |
| EE | 0.25 | 0.04 wt % |
| FF | 0.25 | 0.05 wt % |
| GG | 0.25 | 0.06 wt % |
| HH | 0.25 | 0.07 wt % |
| II | 0.25 | 0.08 wt % |
| JJ | 0.35 | 0.03 wt % |
| KK | 0.35 | 0.04 wt % |
| LL | 0.35 | 0.05 wt % |
| MM | 0.35 | 0.06 wt % |
| NN | 0.4 | 0.03 wt % |
| OO | 0.4 | 0.04 wt % |
| PP | 0.4 | 0.05 wt % |
| QQ | 0.5 | 0.03 wt % |
| RR | 0.5 | 0.04 wt % |
| SS | 0.5 | 0.05 wt % |
| TT | 0.6 | 0.03 wt % |
| UU | 0.6 | 0.04 wt % |
| VV | 0.7 | 0.03 wt % |
| WW | 0.7 | 0.04 wt % |

The Cellulose Compound

The present inventors have surprisingly discovered that the cellulose compound utilized herein is unexpectedly compatible with the three-dimensional network formed by the pectin compound and the alginate compound and provides additional viscosity to the finished product without disrupting or destabilizing such network. Accordingly, the present compositions provide surprisingly enhanced stability and added viscosity to finished products relative to those currently known in the art. The compositions, therefore, surprisingly allow the control of support of materials together with control of viscosity, as well as control of texture (all of which are particularly important for food and beverage products).

Cellulose compounds are widely known in the art. Cellulose compounds are typically anionic polymers derived from cellulose. Non-limiting examples of cellulose compounds utilized herein include carboxymethylcellulose, methylcellulose, and hydroxyethylcellulose, hydroxypropylcellulose. The most preferred cellulose compound for use in the present compositions is carboxymethylcellulose, particularly sodium carboxymethylcellulose. Non-limiting examples of cellulose compounds include sodium carboxymethylcellulose (commercially available as AQUALON 7HOF from Hercules, Inc., Wilmington, Del.).

The cellulose compounds herein are typically utilized in the present compositions at levels preferably from about 0.00001% to about 20%, more preferably from about 0.00001% to about 5%, still more preferably from about 0.00001% to about 1%, even more preferably from about 0.01% to about 0.2%, and most preferably from about 0.02% to about 0.05%, by weight of the composition.

The Enhancer Material

One or more enhancer materials are optionally added to the present compositions and, in accordance with the invention, are surprisingly stabilized by the present compositions. The enhancer material should be insoluble in the present compositions when the composition exhibits a pH of from about 2 to about 4.5 at about 25° C. As used herein, the term "insoluble" means that a substantial amount of the enhancer material is not solubilized in the composition, i.e., at least about 50%, preferably at least about 75% of the enhancer material is not solubilized in the composition at a pH of from about 2 to about 4.5 and at about 25° C. Enhancer materials (e.g., certain minerals) which are soluble can be converted to insoluble enhancer materials through known techniques such as encapsulation, such to provide nutrition, but maintain use as an opacifier.

Preferably, the enhancer material imparts an "enhanced" property to the composition, for example, flavor, nutrition, or opacity (e.g., desired appearance). Accordingly, preferred enhancer materials are selected from flavor and other oils, vitamins, minerals, opacifiers, and materials which are normally insoluble in water at a pH of from about 2 to about 4.5 and at about 25° C.

Even more preferred enhancer materials for inclusion within the present compositions are those selected from vitamins and components comprising at least one element selected from the group consisting of sodium, potassium, magnesium, titanium, chromium, manganese, copper, zinc, iron, aluminum, silicon, phosphorous, and iodine.

The vitamins are preferably the fat soluble vitamins, e.g., vitamins A, D, E, and K are readily stabilized in accordance with the present invention.

Components comprising at least one element selected from sodium, potassium, magnesium, titanium, chromium, manganese, copper, zinc, iron, aluminum, silicon, phosphorous, and iodine are also preferred for use as enhancer materials herein. Preferably the components comprise at least one element selected from titanium and zinc. Preferred components of this type are minerals and opacifiers, preferably opacifiers.

Without intending to be limited by theory, it is believed that the mechanism of stabilization relies on creation of a weak three-dimensional gel network which entraps the enhancer materials, which can result in products which are substantially free of surfactants and emulsifiers. Preferably this network is formed utilizing the processes described herein below.

In another preferred embodiment of the present invention, the enhancer material is an opacifier. Most preferably, the enhancer material is titanium dioxide. Titanium dioxide (i.e., $TiO_2$) is a chemically inert white powder possessing a higher refractive index than many other commercially available pigments.

The present inventors have surprisingly discovered that despite the relatively high density of titanium dioxide (from about 3.8 g/cm$^3$ to about 4.1 g/cm$^3$) the compositions herein stabilize such titanium dioxide and provide high viscosity at relatively low shear but lower viscosity at relatively high shear, making the inclusion of titanium dioxide particularly useful in beverage compositions. Wherein titanium dioxide is utilized herein, oil dispersible or water dispersible titanium dioxide may be utilized, preferably water dispersible. The titanium dioxide may be, for example, in brookite, octahedrite, anatase, or rutile form, preferably anatase or rutile form, and most preferably anatase form. Anatase form is particularly preferred wherein the compositions are utilized for food and/or beverage applications. Anatase titanium dioxide can be obtained from a variety of sources, for example, Kemira Pigments, Ga., U.S.A, distributed by AerChem.

Wherein titanium dioxide is utilized in the compositions of the present invention, the compositions preferably comprise from about 0.0001% to about 5% of titanium dioxide, more preferably from about 0.001% to about 1% of titanium dioxide, still more preferably from about 0.005% to about 0.5% of titanium dioxide, even more preferably from about 0.008% to about 0.1% of titanium dioxide, and most preferably from about 0.01% to about 0.025% of titanium dioxide, all by weight of the composition. These levels may be adjusted, for example, in view of the level of opacity desired in the finished composition.

In another preferred embodiment of the present invention, the enhancer material is an iron compound, e.g., ferric pyrophosphate and iron (EI) oxide.

Other preferred enhancer materials include insoluble vitamins and minerals which are described in considerable detail below.

In another preferred embodiment of the present invention, the enhancer material is an oil. Oils will have a density of about 1 or less but are surprisingly stabilized using the present invention, even without the use of a surfactant. Oils include, for example, vegetable oils, olive oils, canola oils, safflower oils, sunflower oils, corn oils, soybean oils, fatty acids (e.g., polyunsaturated fatty acids (such as linoleic acid and linolenic acid), omega-3-fatty acids, and omega-6-fatty acids), oil dispersible (or oil soluble) vitamins, flavors, and immiscible non-polar materials. Among the fatty acids, omega-3-fatty acids are especially preferred. Oils also include oil droplets containing solids, e.g., oil droplets containing nutrients (vitamins and minerals), and opacifiers (e.g., zinc or titanium dioxide).

Particularly preferred oils for use as enhancer materials are selected from the group of fatty acids, esters thereof, glycerides thereof, and mixtures thereof. As used herein, the fatty acid material contains a fatty acid chain, or wherein the fatty acid material is a fatty acid ester or fatty acid glyceride, contains a fatty acid chain and an ester chain or glyceride backbone. Thus, wherein the fatty acid material is a fatty acid, the material is depicted as follows:

R—COOH wherein "R" is the fatty acid chain which is a saturated or unsaturated chain having at least about 9 carbon atoms, typically from about 9 to about 25 carbon atoms, and wherein "COOH" is a carboxylic acid moiety. More preferably, "R" is a saturated or unsaturated chain having from about 11 to about 23, preferably from about 15 to about 21 carbon atoms and, depending upon the embodiment herein, often preferably from about 15 to about 17 carbon atoms. Also preferably, the fatty acid chain contains from 0 to about 6 double (i.e., olefinic) bonds. More preferably, the fatty acid chain contains from 0 to about 3 double bonds. Most preferably, the fatty acid chain is unsaturated, in particular having one or more double bonds.

Wherein the fatty acid material is an ester of a fatty acid (i.e., an "ester thereof"), the material is depicted as follows:
R—COOR'

Wherein R is the fatty acid chain as defined above, and R' is the ester chain, with the carboxylate moiety "COO" linking the two together. The ester chain is a straight or branched chain of carbon atoms which is hydrolyzable in the presence of mammalian digestive enzymes, preferably human digestive enzymes, and typically contains no more than about 8 carbon atoms. The ester chain more preferably contains from 1 to about 5 carbon atoms and, again, may be a straight (for example, n-propyl) or branched (for example, iso-propyl) chain. Highly preferred ester chains include those which form methyl esters (i.e., R' is —$CH_3$), ethyl esters, n-propyl esters, iso-propyl esters, n-butyl esters, iso-butyl esters, and mixtures thereof. Those which form ethyl esters are particularly preferred.

Wherein the fatty acid material is a glyceride of a fatty acid chain (i.e., a "glyceride thereof"), the fatty acid chain is esterified to a glycerol backbone. Glycerol contains three hydroxy moieties upon its backbone and therefore the esterified glycerol may contain up to three fatty acid chains, wherein each fatty acid chain may be the same or different.

Preferably, wherein the fatty acid material is a glyceride of a fatty acid chain, the glyceride is a triglyceride of the fatty acid chain or of one or more different fatty acid chains. Triglycerides are commonly known as the storage forms of fatty acids. In food, for example, fat is usually in the form of triglycerides. It should be understood, however, that monoglycerides and diglycerides of the fatty acid chain are included within the scope of the present invention.

In a preferred embodiment of the present invention, the fatty acid material is selected from lauric acid, lauroleic acid, myristic acid, myristoleic acid, pentadecanoic acid, palmitic acid, palmitoleic acid, margaric acid, stearic acid, dihydroxystearic acid, oleic acid, ricinoleic acid, elaidic acid, linoleic acid, alpha-linolenic acid, dihomogamma-linolenic acid, eleostearic acid, licanic acid, arachidonic acid, arachidic acid, eicosenoic acid, eicosapentaenoic acid, behenic acid, erucic acid, docosahexaenoic acid, lignoceric acid, esters thereof, and mixtures thereof. Preferred esters of fatty acids include ethyl oleate, ethyl linoleate, and mixtures thereof. As an example, ethyl oleate may be obtained from a variety of sources, including Victorian Chemical Co., Richmond, Victoria; Penta Manufacturing Co., Livingston, N.J.; and Croda, Inc., Parsippany, N.J.

In a particularly preferred embodiment of the present invention, the fatty acid material is selected from omega-3-fatty acids, esters thereof, glycerides thereof, and mixtures thereof. The omega-3-fatty acids are particularly preferred for use herein due to their beneficial effects on the health of the consumer, particularly in the fields of skin and cardiac health. This family of fatty acids is commonly found in oil-rich fish and in various nuts and seeds.

As is well-understood in the art, and as consistently used herein, the term "omega-3-fatty acid" is utilized to refer to those fatty acid materials having an omega-3 double bond wherein the omega-3 double bond is positioned between the third and fourth carbon atoms of the fatty acid chain, when counting from the omega (distal) carbon atom of the chain. Omega-3-fatty acids are preferably derived from marine (fish) sources, including menhaden (a herring-like fish). Non-limiting examples of preferred omega-3-fatty acid sources include OMEGAPURE, commercially available from Omega Protein, Inc., Houston, Tex.

Non-limiting examples of omega-3-fatty acids which are suitable for use herein include eicosapentaenoic acid (also known as EPA), docosahexaenoic acid (also known as DHA), and mixtures thereof. Esters thereof are also contemplated.

In another preferred embodiment of the present invention, the fatty acid material is selected from lauric acid, lauroleic acid, myristic acid, myristoleic acid, pentadecanoic acid, palmitic acid, palmitoleic acid, margaric acid, stearic acid, dihydroxystearic acid, oleic acid, ricinoleic acid, elaidic acid, linoleic acid, alpha-linolenic acid, dihomogamma-linolenic acid, eleostearic acid, licanic acid, arachidonic acid, arachidic acid, eicosenoic acid, behenic acid, erucic acid, lignoceric acid, esters thereof, and mixtures thereof. In this embodiment of the invention, it is particularly preferred to select a fatty acid material containing from 0 to about 3 double bonds and having a fatty acid chain length of from about 15 to about 17 carbon atoms. Additionally, particularly preferred fatty acid materials include oleic acid, linoleic acid, esters thereof, glycerides thereof, and mixtures thereof. Preferred esters of this embodiment include ethyl oleate, ethyl linoleate, and mixtures thereof.

The enhancer material preferably has a density of from about 1 to about 5 or a particle size greater than about 0.2 $\mu$m. Preferably, wherein utilized as an opacifier, the enhancer material exhibits both of these properties, i.e., has a density of from about 1 to about 5 and a particle size greater than about 0.2 $\mu$m. Even more preferably, the enhancer material has a density of at least about 3, and most preferably at least about 3.6. For example, the anatase form of titanium dioxide has a density of about 3.7 to about 3.9 and the rutile form of titanium dioxide has a density of about 3.8 to about 4.2.

Also preferably, the enhancer material has a particle size greater than about 0.2 microns. Without intending to be limited by theory, particle size can be an important factor for imparting opacity, as is commonly desired in food and beverage compositions, particularly fruit juice beverage compositions. For very small particles, light waves pass by the particles without being bent significantly (resulting in clear compositions). However, for larger particles, the number of particles per unit weight of the composition is smaller, which reduces the influence on light scattering. Therefore, to achieve desired opacity, there exists an optimum particle size range to maximize opacifier effectiveness. It has been surprisingly discovered that materials having such particle size can be stabilized in the present compositions. Thus, the enhancer material has a particle size of preferably lower than about 0.5 microns, more preferably lower than about 0.4 microns, even more preferably lower than about 0.3 microns, and most preferably from about 0.2 microns to about 0.3 microns.

As stated, particle size and density are particularly important for materials which are utilized as opacifiers. Wherein, for example, nutrition is desired, the optimum particle size and/or density will be more dependent upon factors related to optimal delivery of the nutrient to the body. One of ordinary skill in the art can select the appropriate factors depending upon the purpose of including the material.

Optional Components, Further Enhancer Materials and Uses of the Present Compositions The compositions described herein are useful in a wide variety of finished compositions. The compositions are useful as, for example, cosmetic, health care (including pharmaceutical and over-the-counter compositions), food, and beverage compositions, preferably food and beverage compositions, most preferably beverage compositions. Such food and beverage compositions include not only "traditional" foods and beverages, but also those such as dietary supplements and medical foods, and the like, under regulatory guidelines.

Such beverage compositions may optionally be dilute water beverages (also called "near-water" beverages), coffees, teas, colas, protein beverages, flavored beverages, isotonic beverages, and fruit juices; preferably teas, protein beverages, and fruit juices, most preferably protein beverages or fruit juices, and often preferably a tea and fruit juice combination.

The compositions of the present invention may comprise additional optional components to enhance their performance as a stabilizing system or as thickening systems, or to otherwise render the composition more suitable for use as an industrial or consumer product, for example, a food or beverage composition. Such optional components may be dispersed, emulsified, solubilized, or otherwise mixed with the pectin compound, the alginate compound, and the thickener to form the compositions. These components may be added to the compositions herein provided they do not substantially hinder properties, particularly stabilization, of the compositions. Non-limiting examples of optional components are given below. Additionally, the following describes further enhancer materials, to the extent that these components are insoluble in the composition at a pH of from about 2 to about 4.5 at a temperature of about 25° C.

Water

Water is typically included in the compositions of the present invention, particularly wherein the compositions are beverage compositions. As used herein, the term "water" includes the total amount of water present in the composition including from, for example, fruit and vegetable juices and dairy sources. Thus, water includes water from, for example, flavor agents, sugar syrups, and other sources, for example, gum solutions. Wherein water is included, water is preferably included at levels from about 0.1% to about 99.999%, more preferably from about 5% to about 99%, still more preferably at least about 50%, even more preferably at least about 70%, and most preferably from about 70% to about 99%, by weight of the composition. Ready-to-drink beverage compositions will typically comprise at least about 70% water, preferably from about 75% to about 99% water, all by weight of the composition.

Beverage Emulsions

As a key benefit of the present inventive processes, emulsions and surfactants are now not necessary for both stabilization of solids and even oils. Therefore, in certain optional embodiments of the present invention, the compositions herein are essentially free of emulsions and surfactants, meaning, comprising less than about 0.2%, more preferably less than about 0.1%, and most preferably less than about 0.05% of total emulsions and surfactants.

However, use of beverage emulsions is not necessarily excluded, and is optional for use in the present processes and compositions. Therefore, dilute juice beverages of the present invention may optionally comprise from about 0.2% to about 5%, preferably from about 0.5% to about 3%, and most preferably from about 0.8% to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils may be employed as the clouding agent, provided that the fat or oil is suitable for use in foods and/or beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See e.g., Kupper et al., U.S. Pat. No. 4,705,691, issued Nov. 10, 1987, for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See e.g., Kupper et al., U.S. Pat. No. 4,705,691, issued Nov. 10, 1987. Modified starches treated to contain hydrophobic as well as hydrophilic groups, such as those described in Caldwell et al., U.S. Pat. No. 2,661,349, are preferred emulsifiers for use as herein. Octenyl succinate (OCS) modified starches such as those described in Marotta et al., U.S. Pat. No. 3,455,838 and Barndt et al., U.S. Pat. No. 4,460,617 are especially preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters which are nondigestible. See e.g., Brand et al., U.S. Pat. No. 4,705,690, issued Nov. 10, 1987.

The cloud/opacifier emulsion may be prepared by mixing the clouding agent with the weighting agent (for opacifier emulsions), the emulsifier and water. The emulsion typically contains from about 0% to about 25% clouding agent, from about 0% to about 20% weighting oil agent (in the case of opacifier emulsions), from about 0% to about 30% emulsifiers, and from about 25% to about 97.9% water (or quantum satis).

Flavor emulsions useful in beverage products of the present invention comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include, for example, fruit flavors such as orange, lemon, lime and the like, cola flavors, tea flavors, coffee flavors, chocolate flavors, dairy flavors. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See e.g., Kupper et al., U.S. Pat. No. 4,705,691, issued Nov. 10, 1987.

Flavor Agents

The compositions herein may optionally, but preferably, comprise one or more flavor agents. Preferably, such flavor agents are included in the beverage compositions and are typically selected from fruit juice, fruit flavors, botanical flavors, and mixtures thereof. Wherein fruit juice is included, the beverages of the present invention can comprise from about 0.1% to about 99%, preferably from about 1% to about 50%, more preferably from about 2% to about 15%, and most preferably from about 3% to about 6%, fruit juice. (As measured herein, the weight percentage of fruit juice is based on a single strength 2° to 16° Brix fruit juice). The fruit juice can be incorporated into the beverage as a puree, comminute, or as a single strength or concentrated juice. Especially preferred is incorporation of the fruit juice as a concentrate with a solids content (primarily as sugar solids) of from about 20° to about 80° Brix.

The fruit juice can be any citrus juice, non-citrus juice, or mixture thereof, which are known for use in dilute juice beverages. The juice can be derived from, for example, apple, cranberry, pear, peach, plum, apricot, nectarine, grape, cherry, currant, raspberry, gooseberry, elderberry, blackberry, blueberry, strawberry, lemon, lime, mandarin, orange, grapefruit, cupuacu, potato, tomato, lettuce, celery, spinach, cabbage, watercress, dandelion, rhubarb, carrot, beet, cucumber, pineapple, coconut, pomegranate, kiwi, mango, papaya, banana, watermelon, passion fruit, tangerine, and cantaloupe. Preferred juices are derived from apple, pear, lemon, lime, mandarin, grapefruit, cranberry, orange, strawberry, tangerine, grape, kiwi, pineapple, passion fruit, mango, guava, raspberry and cherry. Citrus juices, preferably grapefruit, orange, lemon, lime, and mandarin juices, as well as juices derived from mango, apple, passion fruit, and guava, as well as mixtures of these juices are most preferred.

Fruit flavors may also be utilized. As described above with respect to flavor emulsions, fruit flavors may be derived from natural sources such as essential oil and extracts, or can be synthetically prepared. Fruit flavors may be derived from fruits through processing, particularly concentrating. Wherein fruit juices are concentrated or evaporated, the water which is removed or the condensate contains volatile substances which comprise the flavor of the fruit. Often, such flavor is added to a juice concentrate to enhance the flavor thereof. The condensate may also be used to flavor "near waters" (lightly flavored water).

Botanical flavors may also be utilized. As used herein, the term "botanical flavor" refers to a flavor derived from parts of a plant other than the fruit; i.e., derived from nuts, bark, roots, and/or leaves. Also included within the term "botanical flavor" are synthetically prepared flavors made to simulate botanical flavors derived from natural sources. Botanical flavors can be derived from natural sources such as essential oils and extracts, or can be synthetically prepared. Suitable botanical flavors include jamaica, kola, marigold, chrysanthemum, chamomile, ginger, valerian, yohimbe, hops, eriodictyon, ginseng, bilberry, rice, red wine, mango, peony, lemon balm, nut gall, oak chip, lavender, walnut, gentiam, luo han guo, cinnamon, angelica, aloe, agrimony, yarrow and mixtures thereof.

Wherein tea solids are included, the beverages of the present invention can comprise from about 0.01% to about 1.2%, preferably from about 0.05% to about 0.8%, by weight of the beverage product, of tea solids. The term "tea solids" as used herein means solids extracted from tea materials including those materials obtained from the genus Camellia including *C. sinensis* and *C. assaimica*, for instance, freshly gathered tea leaves, fresh green tea leaves that are dried immediately after gathering, fresh green tea leaves that have been heat treated before drying to inactivate any enzymes present, unfermented tea, instant green tea, and partially fermented tea leaves. Green tea solids are tea leaves, tea plant stems, and other plant materials that are related and which have not undergone substantial fermentation to create black teas. Members of the genus Phyllanthus, *Catechu gambir* and Uncaria family of tea plants can also be used. Mixtures of unfermented and partially fermented teas can be used.

Tea solids for use in beverages of the present invention can be obtained by known and conventional tea solid extraction methods. A particularly preferred source of green tea solids can be obtained by the method described in Ekanayake et al., U.S. application Ser. No. 08/606,907, filed Feb. 26, 1996. Tea solids so obtained will typically comprise caffeine, theobromine, proteins, amino acids, minerals and carbohydrates. Suitable beverages containing tea solids can be formulated according to Tsai et al., U.S. Pat. No. 4,946,701, issued Aug. 7, 1990. See also, Ekanayake et al., U.S. Pat. No. 5,427,806, issued Jun. 26, 1995, for a suitable sources of green tea solids for use in the present invention.

Protein may also be utilized. For example, dairy protein (e.g., whey protein, milk (either as milk solids or added milk) may be utilized. Soy protein is also preferred, for example as soy solids or soy milk.

Sweeteners

The food and beverage compositions of the present invention can, and typically will, contain an effective amount of one or more sweeteners, including carbohydrate sweeteners and natural and/or artificial no/low calorie sweeteners. The amount of the sweetener used in the compositions of the present invention typically depends upon the particular sweetener used and the sweetness intensity desired. For no/low calorie sweeteners, this amount varies depending upon the sweetness intensity of the particular sweetener.

The compositions of the present invention can be sweetened with any of the carbohydrate sweeteners, preferably monosaccharides and/or disaccharides. Sweetened compositions, particularly beverages, will typically comprise from about 0.1% to about 40%, more preferably from about 0.1% to about 20%, and most preferably from about 6 to about 14%, sweetener. These sweeteners can be incorporated into the compositions in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as, for example, the fruit juice component and/or flavors.

Preferred sugar sweeteners for use in compositions of the present invention are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein, as fructose. Other naturally occurring sweeteners or their purified extracts, such as glycyrrhizin, the protein sweetener thaumatin, the juice of Luo Han Guo disclosed in, for example, Fischer et al., U.S. Pat. No. 5,433,965, issued Jul. 18, 1995, and the like can also be used in the compositions of the present invention.

Suitable no/low calorie sweeteners include saccharin, cyclamates, L-aspartyl-L-phenylalanine lower alkyl ester sweeteners (e.g., aspartame); L-aspartyl-D-alanine amides disclosed in Brennan et al., U.S. Pat. No. 4,411,925; L-aspartyl-D-serine amides disclosed in Brennan et al., U.S. Pat. No. 4,399,163; L-aspartyl-L-1-hydroxymethylalkaneamide sweeteners disclosed in Brand, U.S. Pat. No. 4,338,346; L-aspartyl-1-hydroxyethylalkaneamide sweeteners disclosed in Rizzi, U.S. Pat. No. 4,423,029; L-aspartyl-D-phenylglycine ester and amide sweeteners disclosed in Janusz, European Patent Application 168,112, published Jan. 15, 1986; N-[N-3,3-dimethylbutyl)-L-alpha-aspartyl]-L-phenylalanine 1-methyl ester sweeteners disclosed in Gerlat et al., WO 99/30576, assigned to The Nutrasweet Co., published Jun. 24, 1999; alltame, thaumatin; dihydrochalcones; cyclamates; stevio-sides; glycyrrhizins, synthetic alkoxy aromatics, such as Dulcin and P-4000; sucrolose; suosan; miraculin; monellin; sorbitol, xylitol; talin; cyclohexylsulfamates; substituted imidazolines; synthetic sulfamic acids such as acesulfame, acesulfame-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alpha-aminodicarboxylic acids and gem-diamines; and 3-hydroxy-4-alkyloxyphenyl aliphatic carboxylates or heterocyclic aromatic carboxylates; and the like and mixtures thereof. A particularly preferred low calorie sweetener is aspartame.

Coloring Agent

Small amounts of coloring agents may be utilized in the compositions of the present invention. Natural and artificial colors may be used.

FD & C dyes (e.g., yellow #5, blue #2, red # 40) and/or FD&C lakes are preferably used. By adding the lakes to the other powdered ingredients, all the particles, in particular the colored iron compound, are completely and uniformly colored and a uniformly colored composition is attained. Preferred lake dyes which may be used in the present invention are the FDA-approved Lake, such as Lake red #40, yellow #6, blue #1, and the like. Additionally, a mixture of FD&C dyes or a FD & C lake dye in combination with other conventional food and food colorants may be used.

Other coloring agents, for example, natural agents may be utilized. Non-limiting examples of such other coloring agents include fruit and vegetable juices, riboflavin, carotenoids (e.g., β-carotene), tumeric, and lycopenes.

The exact amount of coloring agent used will vary, depending on the agents used and the intensity desired in the finished product. Generally, if utilized, the coloring agent should be present at a level of from about 0.0001% to about 0.5%, preferably from about 0.001% to about 0.1%, and most preferably from about 0.004% to about 0.1%, by weight of the composition.

Nutrients

The compositions herein (particularly the food and beverage compositions) can be fortified with one or more nutrients, especially one or more vitamins and/or minerals. The U.S. Recommended Daily Intake (USRDI) for vitamins and minerals are defined and set forth in the Recommended Daily Dietary Allowance-Food and Nutrition Board, National Academy of Sciences-National Research Council.

Unless otherwise specified herein, wherein a given mineral is present in the product, the product comprises at least about 1%, preferably at least about 5%, more preferably from about 10% to about 200%, even more preferably from about 40% to about 150%, and most preferably from about 60% to about 125% of the USRDI of such mineral. Unless otherwise specified herein, wherein a given vitamin is present in the product, the product comprises at least about 1%, preferably at least about 5%, more preferably from about 10% to about 200%, even more preferably from about 20% to about 150%, and most preferably from about 25% to about 120% of the USRDI of such vitamin.

Non-limiting examples of such vitamins and minerals include iron, zinc, copper, phosphorous, biotin, folic acid, pantothenic acid, iodine, vitamin A, vitamin C, vitamin $B_1$, vitamin $B_2$, vitamin $B_3$, vitamin $B_6$, vitamin $B_{12}$, vitamin D, vitamin E, and vitamin K. Preferably, wherein a vitamin or mineral is utilized the vitamin or mineral is selected from iron, zinc, folic acid, iodine, vitamin A, vitamin C, vitamin $B_1$, vitamin $B_3$, vitamin $B_6$, vitamin $B_{12}$, vitamin D, and vitamin E. Calcium should be avoided, unless it is encapsulated, as it has been found that this mineral tends to disrupt the three-dimension network provided by the pectin and alginate compounds. Therefore, encapsulated calcium may be utilized.

Commercially available vitamin A sources may also be included in the present compositions. As used herein, "vitamin A" includes, but is not limited to, retinol, β-carotene, retinol palmitate, and retinol acetate. The vitamin A may be in the form of, for example, an oil, beadlets or encapsulated.

Wherein vitamin A is present in the compositions herein, the product comprises at least about 1%, preferably at least about 5%, more preferably from about 10% to about 200%, even more preferably from about 15% to about 150%, and most preferably from about 20% to about 120% of the USRDI of vitamin A. The quantity of vitamin A to be added is dependent on processing conditions and the amount of vitamin A deliver desired after storage. Preferably, wherein vitamin A is included within the present compositions, the products comprise from about 0.0001% to about 0.2%, more preferably from about 0.0002% to about 0.12%, also preferably from about 0.0003% to about 0.1%, even more preferably from about 0.0005% to about 0.08%, and most preferably from about 0.001% to about 0.06% of vitamin A, by weight of the composition.

Commercially available sources of vitamin $B_2$ (also known as riboflavin) may be utilized in the present compositions. Wherein vitamin $B_2$ is present in the compositions herein, the product comprises at least about 1%, preferably at least about 5%, more preferably from about 5% to about 200%, even more preferably from about 10% to about 100%, and most preferably from about 10% to about 50% of the USRDI of vitamin $B_2$.

Commercially available sources of vitamin C can be used herein. Encapsulated ascorbic acid and edible salts of ascorbic acid can also be used. Wherein vitamin C is present in the products herein, the product comprises at least about 1%, preferably at least about 5%, more preferably from about 10% to about 200%, even more preferably from about 20% to about 150%, and most preferably from about 25% to about 120% of the USRDI of such vitamin.

The quantity of vitamin C to be added is dependent on processing conditions and the amount of vitamin C deliver desired after storage. Preferably, wherein vitamin C is included within the present compositions, the compositions comprise from about 0.005% to about 0.2%, more preferably from about 0.01% to about 0.12%, also preferably from about 0.02% to about 0.1%, even more preferably from about 0.02% to about 0.08%, and most preferably from about 0.03% to about 0.06% of vitamin C, by weight of the composition.

Commercial sources of iodine, preferably as an encapsulated iodine may be utilized herein. Other sources of iodine include iodine-containing salts, e.g., sodium iodide, potassium iodide, potassium iodate, sodium iodate, or mixtures thereof.

Nutritionally supplemental amounts of other vitamins which may be incorporated herein include, but are not limited to, vitamins $B_1$, $B_3$, $B_6$ and $B_{12}$, folic acid, pantothenic acid, folic acid, vitamin D, and vitamin E. Wherein the composition comprises one of these vitamins, the product preferably comprises at least 5%, preferably at least 25%, and most preferably at least 35% of the USRDI for such vitamin.

Minerals which may optionally be included in the composition herein are, for example, magnesium, zinc, iodine, iron, and copper. Any soluble salt of these minerals suitable for inclusion in edible products can be used, for example, magnesium citrate, magnesium gluconate, magnesium sulfate, zinc chloride, zinc sulfate, potassium iodide, copper sulfate, copper gluconate, and copper citrate.

Iron may also be utilized in the compositions of the present invention. Acceptable forms of iron are well-known in the art. The amount of iron compound incorporated into the composition will vary widely depending upon the level of supplementation desired in the final product and the targeted consumer. Iron fortified compositions of the present invention typically contain from about 5% to about 100%, preferably from about 15% to about 50%, and most preferably about 20% to about 40% of the USRDI for iron.

Highly bioavailable ferrous salts that can be used in the ingestible compositions of the present invention are ferrous sulfate, ferrous fumarate, ferrous succinate, ferrous gluconate, ferrous lactate, ferrous tartarate, ferrous citrate, ferrous amino acid chelates, as well as mixtures of these ferrous salts. While ferrous iron is typically more bioavailable, certain ferric salts can also provide highly bioavailable sources of iron.

While ferrous iron is typically more bioavailable, certain ferric salts can also provide highly bioavailable sources of iron. Highly bioavailable ferric salts that can be used in the food or beverage compositions of the present invention are ferric saccharate, ferric ammonium citrate, ferric citrate, ferric sulfate, ferric pyrophosphate, as well as mixtures of these ferric salts. Combinations or mixtures of highly bioavailable ferrous and ferric salts can be used in these edible mixes and ready-to-serve beverages. The preferred sources of highly bioavailable iron are ferrous fumarate and ferrous amino acid chelates.

A particularly preferred ferric iron source is ferric pyrophosphate, for example, microencapsulated SUNACTUVE Iron, commercially available from Taiyo International, Inc., Edina, Minn., U.S.A and Yokkaichi, Mie, Japan. SUNACTIVE Iron is particularly preferred for use herein due to its particle size, compatibility, and bioavailability.

Ferrous amino acid chelates particularly suitable as highly bioavailable iron sources for use in the present invention are those having a ligand to metal ratio of at least 2:1. For example, suitable ferrous amino acid chelates having a ligand to metal mole ratio of two are those of formula:

where L is an alpha amino acid, dipeptide, tripeptide, or quadrapeptide ligand. Thus, L can be any ligand which is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, and valine; or dipeptides, tripeptides, or quadrapeptides formed by any combination of these alpha amino acids. See e.g., Ashmead et al., U.S. Pat. No. 4,863,898, issued Sep. 5, 1989; Ashmead, U.S. Pat. No. 4,830,716, issued May 16, 1989; and Ashmead, U.S. Pat. No. 4,599,152, issued Jul. 8, 1986, all of which are incorporated by reference. Particularly preferred ferrous amino acid chelates are those where the reacting ligands are glycine, lysine, and leucine. Most preferred is the ferrous amino acid chelate sold under the mark FERROCHEL (Albion Laboratories, Salt Lake City, Utah) wherein the ligand is glycine.

In addition to these highly bioavailable ferrous and ferric salts, other sources of bioavailable iron can be included in the food and beverage compositions of the present invention. Other sources of iron particularly suitable for fortifying products of the present invention included certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex. Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid tartaric acid, lactic acid, succinic acid, propionic acid, etc., as well as mixtures of these acids.

These iron-sugar-carboxylate complexes can be prepared in the manner described in, e.g., Nakel et al., U.S. Pat. Nos. 4,786,510 and 4,786,518, issued Nov. 22, 1988. These materials are referred to as "complexes", but they may exist in solution as complicated, highly hydrated, protected colloids; the term "complex" is used for the purpose of simplicity.

Zinc may also be utilized in the compositions of the present invention. Acceptable forms of zinc are well-known in the art. Zinc fortified products of the present invention typically contain from about 5% to about 100%, preferably from about 15% to about 50%, and most preferably about 25% to about 45% of the USRDI for zinc. The zinc compounds which can be used in the present invention can be in any of the commonly used forms such as, e.g., zinc sulfate, zinc chloride, zinc acetate, zinc gluconate, zinc ascorbate, zinc citrate, zinc aspartate, zinc picolinate, amino acid chelated zinc, and zinc oxide. Zinc gluconate and amino acid chelated zinc are particularly preferred.

Fiber

Food and beverage compositions can be made which further comprise one or more dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, apples, apricots, and watermelon rinds.

Particularly preferred fibers for use herein are glucose polymers, preferably those which have branched chains, and which are typically less digestible relative to starches and maltodextrins. Preferred among these fibers is one marketed under the trade name Fiβersol2, commercially available from Matsutani Chemical Industry Co., Itami City, Hyogo, Japan.

Fructo-oligosaccharides are also preferred fibers herein. The preferred fructo-oligosaccharides are a mixture of fructo-oligosaccharides composed of a chain of fructose molecules linked to a molecule of sucrose. Most preferably, they have a nystose to kestose to fructosyl-nystose ratio of about 40:50:10, by weight of the composition. Preferred fructo-oligosaccharides may be obtained by enzymatic action of fructosyltransferase on sucrose such as those which are, for example, commercially available from Beghin-Meiji Industries, Neuilly-sur-Seine, France.

Other preferred fibers for use herein include arabinogalactans. Non-limiting examples of preferred, commercially available sources of arabinogalactan include LAREX UF, LARACARE A200, IMMUNENHANCER (CAS No. 9036-66-2), CLEARTRAC, FIBERAID, and AC-9, all commercially available from (for example) Larex, Inc. of St. Paul, Minn., U.S.A.

These dietary fibers may be in a crude or purified form. The dietary fiber used may be of a single type (e.g., cellulose), a composite dietary fiber (e.g., citrus albedo fiber containing cellulose and pectin), or some combination of fibers (e.g., cellulose and a gum). The fibers can be processed by methods known to the art.

Wherein a soluble fiber is utilized, the desired total level of soluble dietary fiber for the present compositions of the present invention is from about 0.01% to about 15%, preferably from about 0.1% to about 5%, more preferably from about 0.1% to about 3%, and most preferably from about 0.2% to about 2%. The total amount of soluble dietary fiber includes any added soluble dietary fiber as well as any soluble dietary fiber naturally present in any other component of the present invention.

Carbonation Component

Carbon dioxide can be introduced into the water which is mixed with a beverage syrup or into the dilute beverage after dilution to achieve carbonation. The carbonated beverage can be placed into a container, such as a bottle or can, and then sealed. Any conventional carbonation methodology may be utilized to make carbonated beverage products of this invention. The amount of carbon dioxide introduced into the beverage will depend upon the particular flavor system utilized and the amount of carbonation desired.

pH

The preferred compositions of the present invention, particularly the beverage compositions, have a pH of from about 2 to about 5, more preferably from about 2 to about 4, even more preferably from about 2.7 to about 3.5, and most preferably from about 2.9 to about 3.3. Beverage acidity can be adjusted to and maintained within the requisite range by known and conventional methods, e.g., the use of food grade acid buffers (for example, sodium citrate or calcium). Typically, beverage acidity within the above recited ranges is a balance between maximum acidity for microbial inhibition and optimum acidity for the desired beverage flavor.

Organic as well as inorganic edible acids may be used to adjust the pH of the beverage composition. The acids can be present in their undissociated form or, alternatively, as their respective salts, for example, potassium or sodium hydrogen phosphate, potassium or sodium dihydrogen phosphate salts. The preferred acids are edible organic acids which include citric acid, malic acid, fumaric acid, adipic acid, phosphoric acid, gluconic acid, tartaric acid, ascorbic acid, acetic acid, phosphoric acid or mixtures thereof. The most preferred acids are citric and malic acids. Glucono Delta Lactone (GDL) is also a preferred acid for use herein, particularly wherein it is desired to reduce pH without introducing excessive acidic, or tart, flavor in to the final composition.

The acidulant can also serve as an antioxidant to stabilize beverage components. Examples of commonly used antioxidant include but are not limited to ascorbic acid, EDTA (ethylenediamine tetraacetic acid), and salts thereof.

This discussion of the composition uses, combinations, and benefits, is not intended to be limiting or all-inclusive. It is contemplated that other similar uses and benefits can be found that will fall within the spirit and scope of this invention.

Properties of Compositions of the Present Invention

The present compositions are stable compositions exhibiting defined stability properties which are expressed by their physical stability as defined by the Average Physical Stability Grade Method herein. It has been surprisingly discovered that a thickener may be included within the present compositions without substantially affecting the Average Physical Stability Grade exhibited by the composition, as is described in detail below.

Sedimentation, creaming, or instability of materials, results from the action of gravitational force on phases that differ in density. Sedimentation and creaming are well-known in the art, and have been extensively described using Stokes Law of Sedimentation. Rates of sedimentation and creaming will differ depending on, for example, the density and/or particle size of the material relative to a continuous phase of the composition, and the viscosity (cP) of the composition. For example, absent a composition of the present invention, a product exhibiting a viscosity of 10 cP and comprising a material having a particle size of about 0.5 $\mu$m will "settle" a distance of about 10 centimeters in about 28 days. Additionally, flocculation (or, aggregation of particles) can occur. Therefore, to provide stable compositions, there is a need to provide a network within the composition to entrap the material in order to prevent sedimentation.

The present inventors having surprisingly discovered compositions comprising a pectin compound, an alginate compound, and one or more enhancer materials which provides a physical stability which is acceptable for delivery of such materials in finished products. Such compositions are defined herein by their Average Physical Stability Grade which is obtained by the methodology which follows.

As defined by this methodology, the present compositions exhibit an Average Physical Stability Grade of about 3 or less, preferably of about 2 or less, more preferably about 1 or less, and most preferably about 0; optionally wherein at least one material of the composition has a density from about 1 to about 5, preferably at least about 3, and most preferably at least about 3.6, and/or has a particle size of greater than about 0.2 microns, preferably greater than about 0.25 microns, more preferably greater than about 0.3 microns, and most preferably greater than about 0.4 microns. The Average Physical Stability Grade Method is as follows:

Average Physical Stability Grade Method

The Average Physical Stability Grade Method uses quantitative measurements to express the degree of sedimentation and/or flocculation of particles within a given composition, as set forth by the Average Physical Stability Grade of the composition on any given day after preparation of the composition. The Method utilizes a high intensity fiber optic light system to visualize any sedimentation and/or flocculation. The fiber optic light system utilized herein is Fiber Optic Light Illuminator Model 1-150, commercially available from CUDA Products Corp., Jacksonville, Fla. However, any system providing substantially similar results may be utilized. The fiber optic light system supplies a focused high intensity light via a fiber which is illuminated with a 150 Watt halogen lamp. When using the fiber optic light system, it is preferred that the observers wear dark glasses to reduce the amount of light which reaches the observer's eyes. Average Physical Stability Grades 0 through 3 require use of the fiber optic light system, while Average Physical Stability Grades 4 through 7 do not require such high intensity light.

In accordance with the present method, a composition is prepared on day 0. Control compositions not containing a composition of the present invention may be tested to provide an Average Physical Stability Grade. Additionally, this Method is utilized to determine the Average Physical Stability Grade of a composition of the present invention. On day 0, the composition to be tested is prepared and from about 900 mL to about 1000 mL of the composition is contained within a 1000 mL clear glass container. The container is sealed using a standard twist-style lid during times when the average Physical Stability Grade is not being determined. Throughout the duration of the Method, the composition is maintained at a temperature of from about 65° F. to about 75° F.

On any given day, starting with day 0, the composition may be tested for Average Physical Stability Grade. Ten observers, who are ordinarily skilled in detecting sedimentation and/or flocculation in liquid compositions, are utilized to determine the Average Physical Stability Grade for the composition on any given day of the Method. A 75 Watt lamp is placed approximately 6 inches from the container, and the observer determines Physical Stability Grade by looking (without visual aid, other tan using the fiber optic light system) at the container at a 180° angle relative to the center of the light, approximately 12 inches from the nearest surface of the container. For any given day of the Method, each of the ten observers assigns a Physical Stability Grade according to the scale set forth in the following Table 1:

TABLE 1

| Physical Stability Grade | Observation |
| --- | --- |
| 0 | Using the fiber optic light system, no detectable flocculation or sedimentation; no detectable flocculation or sedimentation without using fiber optic light system |
| 1 | Using the fiber optic light system, slight flocculation or sedimentation is detectable; no detectable flocculation or sedimentation without using fiber optic light system |
| 2 | Using the fiber optic light system, significant but isolated flocculation or sedimentation is detectable; no detectable flocculation or sedimentation without using fiber optic light system |
| 3 | Using the fiber optic light system, high concentrations of flocculation or sedimentation are detectable; no detectable flocculation or sedimentation without using fiber optic light system |
| 4 | Slight flocculation or sedimentation is detectable without fiber optic light system |
| 5 | Significant flocculation or sedimentation is readily detectable without fiber optic light system |
| 6 | Slight flocculation or sedimentation is readily detectable and phase separation is detectable without fiber optic light system |
| 7 | Heavy flocculation and syneresis is readily detectable without fiber optic light system |

After each observer assigns a Physical Stability Grade to a composition for any given day, the ten Grades are averaged to give an Average Physical Stability Grade for that day (the Average Physical Stability Grade may be a non-integer, for example, 2.23). In accordance with the present invention, the present compositions exhibit an Average Physical Stability Grade of about 3 or less at greater than about 75 days. In preferred embodiments herein, the present compositions exhibit an Average Physical Stability Grade of about 3 or less at greater than about 90 days, more preferably greater than about 120 days, and most preferably greater than about 150 days. Additionally, the present compositions preferably exhibit an Average Physical Stability Grade of about 2 or less at greater than about 75 days, more preferably greater than about 90 days, even more preferably greater than about 120 days, and most preferably greater than about 150 days. Additionally, the present compositions preferably exhibit an Average Physical Stability Grade of about 1 or less at greater than about 75 days, more preferably greater than about 90 days, even more preferably greater than about 120 days, and most preferably greater than about 150 days. Additionally, the present compositions preferably exhibit an Average Physical Stability Grade of 0 at greater than about 75 days, more preferably greater than about 90 days, even more preferably greater than about 120 days, and most preferably greater than about 150 days.

Processes of Making the Present Compositions

The compositions described herein are made by any of a variety of processes well-known to one of ordinary skill in the art. Additionally, processes described in Barey, U.S. Pat. No. 5,866,190, assigned to Systems Bio-Industries, issued Feb. 2, 1999 may be of use. However, improved processes which provide compositions having optimized stability and/or viscosity, relative to those prepared by commonly known processes, have been discovered. In particular, these processes have been found to be critical for stability of the finished composition wherein the composition is subjected to temperature transitions in the range of from about 40° F. to about 90° F., as is common with storage and transportation of beverage compositions. Previous processes will result in compositions which do not remain stable (e.g., flocculation or separation will occur) over these temperature transitions.

The processes described herein provide optimized stability of the finished compositions described herein. In particular, these processes have been found to be critical for stability of the finished composition, particularly wherein the composition is subjected to temperature transitions in the range of from about 40° F. to about 90° F., as is common with storage and transportation of beverage compositions. Previous processes will result in compositions which do not remain stable (e.g., flocculation will occur) over these temperature transitions.

The present processes comprise:
(a) forming a dispersion, wherein the dispersion comprises a stabilizer system, an enhancer material, and an aqueous liquid;
(b) introducing a beverage component to the dispersion, wherein the beverage component comprises an edible acid; and
(c) further dispersing the beverage component with the dispersion according to a method selected from the group consisting of:
(i) dispersing the beverage component at a NP/M of from about 20 Watt/Kg to about 75 Watt/Kg;
(ii) dispersing the beverage component over a time period from about one minute to about 1 hour; and (iii) a combination thereof.

As used herein, the term "NP/M" means net-power-per-unit-mass, as is standard in the art. Additionally, also standard, the term "Watt/Kg" means watts per kilogram. As will be understood by one of ordinary skill in the art, these are measures of mixing energy, which is a key element of the present invention.

Thus, the present processes are defined by mixing energies and/time over which a dispersion comprising the stabilizer system and enhancer material are introduced to a beverage component, in order to form a composition which is stable even without complicated processes such as emulsification and even over temperature transitions. As has been surprisingly discovered, the present processes do not require any thermal treatment, and thus provide a significant advantage over known methods of producing stabilized compositions (typically, these known processes will require thermal setting of the systems utilized (see e.g., Barey, U.S. Pat. No. 5,866,190, assigned to Systems Bio-Industries, Feb. 2, 1999)). However, it should be noted that use of thermal treatment is not excluded as part of the present processes, and may be optionally used. Notwithstanding, the present processes are preferably performed at a temperature below about 80° C., more preferably below about 50° C., even more preferably below about 40° C., and most preferably below about 30° C. These preferred temperatures render a more simplified process, and maintain the integrity of the various ingredients within the composition, particularly those which are thermally sensitive.

As stated, the first step of the present processes involves forming a dispersion, wherein the dispersion comprises a stabilizer system, an enhancer material, and an aqueous liquid. The dispersion is formed at energies of mixing which are sufficient to disperse the materials and/or hydrate the stabilizer system. Preferably, the dispersion is formed at a NP/M of from about 20 Watt/Kg to about 75 Watt/Kg.

The stabilizer system, enhancer material, and aqueous liquid may be added in any order, concurrently or separately as desired. However, it is preferred herein to form the dispersion in a step-wise manner. In a preferred embodiment of the present invention, formation of the dispersion (now termed the "second dispersion" for convenience) comprises the steps of:

(a) introducing the stabilizer system to the aqueous liquid;
(b) dispersing the stabilizer system with the liquid, preferably at a first NP/M of from about 20 Watt/Kg to about 75 Watt/Kg to form a first dispersion;
(c) introducing an enhancer material to the first dispersion; and
(d) further dispersing the enhancer material with the first dispersion, preferably at a second NP/M of from about 20 Watt/Kg to about 75 Watt/Kg to form a second dispersion. Thus, the preferred embodiment of this process involves introducing the stabilizer system to an aqueous liquid. By the term "introducing to", it is meant that the stabilizer system may be added to the aqueous liquid or, alternatively, the aqueous system is added to the stabilizer system. The aqueous liquid is preferably water, although the liquid may be any of a variety of components dispersed or solubilized in water. This step disperses and/or hydrates the stabilizer system.

In this preferred embodiment, once the two components are introduced, according to the preferred embodiment, they are subjected to a first mixing energy to form a first dispersion. The first mixing energy is that which is sufficient to disperse the materials, as will be well-understood by one of ordinary skill in the art. Preferably, the first mixing energy (i.e., the first NP/M) is from about 20 Watt/Kg to about 75 Watt/Kg. Surprisingly, the present inventors have discovered that wherein the components are subjected to a mixing energy in this range, the final composition is optimally stabilized. This stabilization is measured by the Average Physical Stability Grade the composition exhibits (described below), and/or the viscosity the final composition exhibits (also described below). As the present inventors have discovered, the first mixing energy (i.e., the first NP/M) is preferably from about 30 Watt/Kg to about 60 Watt/Kg, most preferably from about 30 Watt/Kg to about 50 Watt/Kg.

The means for subjecting the components to the mixing energy may be selected from a variety of well-known apparatuses (energizing means) which are commercially available. For example, this energizing means may be a mixer which provides energy to the liquid medium by forming ultrasonic vibrations therein, e.g., a Sonolator, commercially available from Sonic Corporation, Stratford, Conn. or Piezoelectric transducers. The Sonolator is an in-line system providing ultrasonic vibrations by pumping a liquid, a blend of liquids, or a solid dispersion in a liquid through a shaped orifice at a high linear velocity. The liquid stream impinges against a blade cantilevered in the stream. Flow over the blade causes vibrations in the blade which produces cavitation in the stream converting flow energy into mixing/dispersion energy. Other particularly useful energizing means include batch mixers providing a high agitator tip speed, e.g., blenders as available from Sunbeam Corporation of Delray Beach, Fla. with the brand name OSTERIZER. Additionally rotor/stator high shear mixers, as are available from Charles Ross & Son, Hauppauge, N.Y. are useful. In-line mixers such as are available from Quadro Inc., Millburn, N.J., as model Quadro ZC/XC are useful as well. Additionally, particularly preferred energizing means for use herein include the Breddo Likwifier, Model LOR, commercially available from Breddo Likwifier, Kans. City, Mo. and Multiverter/Liquiverter high speed mixers commercially available from APV Crepaco, Inc., Lake Mills, Wis.

As will be commonly understood, mixing energy is calculated through measure of the current and voltage used to deliver the energy to the components to form the dispersion. For example, a suitable power analyzer is available from Fluke Corporation, Everett, Wash. (e.g., Model 41B Power Harmonics Analyzer). Additionally, a suitable Amp Probe is Model 80I-1000S, also available from Fluke Corporation. Using these or similar instruments, the mixing energy is determined. Example 1 below provides a non-limiting example:

EXAMPLE 1

The instruments utilized are:

1. Model 41B Power Harmonics Analyzer, commercially available from Fluke Corporation, Everett, Wash.; and
2. Amp Probe is Model 80I-1000S, commercially available from Fluke Corporation, Everett, Wash.

Ensure all instruments are calibrated according to the manufacturer's instructions. Place the amp probe around one of the conductors of the electrical supply line for the energizing means. Attached voltage probes to the other conductors of the supply line. The Model 41B Power Harmonics Analyzer calculates a three-phase power readout from a simple, single-phase measurement of a balanced three-conductor load. Power measurements are sent and recorded to a computer spread sheet (e.g., MICROSOFT EXCEL) using software supplied with the instrument (e.g., FLUKE VIEW Version 3.0).

Measure the power consumption for the entire range of speed for the specific energizing means being utilized. Record the power reading from the power analyzer every 10 seconds during dispersion. If desired, data acquisition hardware and software may be used to sample and record power readings automatically.

To record and analyze data, calculate the net power by subtracting the power consumption at the run speed from the power consumption while adding a component to the other component. Calculate net-power-per-unit-mass (NP/M) by dividing the net power by the mass of material being energized after addition of the component(s) to the other component(s). Report net power and NP/M for each addition step.

Typically, in this preferred embodiment, the stabilizer system and the aqueous liquid are subjected to the first NP/M for about two minutes to about five minutes. However, the ordinarily skilled artisan can determine an appropriate mixing time depending on factors such as the components specifically used and/or the energizing means used.

According to this preferred embodiment, the enhancer material may then be introduced to the first dispersion. Again, through the term "introduced to", it is meant that the enhancer material is added to the first dispersion or, alternatively, the first dispersion is added to the enhancer material. Preferably, the enhancer material is added to the first dispersion.

The enhancer material and the first dispersion are then subjected to a second mixing energy (i.e., the second NP/M) to form the second dispersion (i.e., the "dispersion", as referred to in the broadest embodiment). The second mixing energy is typically independent from the first mixing energy chosen, and is typically from about 20 Watt/Kg to about 75 Watt/Kg. Surprisingly, the present inventors have discovered that wherein the components are subjected to a mixing energy in this range, the final composition is optimally stabilized. This stabilization is measured by the Average Physical Stability Grade the composition exhibits (described below), and/or the viscosity the final composition exhibits (also described below). As the present inventors have discovered, the second mixing energy is preferably from about 30 Watt/Kg to about 60 Watt/Kg, most preferably from about 30 Watt/Kg to about 50 Watt/Kg. Of course, the same (or optionally, different, but preferably the same) energizing means and analytical methods may be used with respect to forming the first dispersion as is described above and in Example 1.

Typically, the enhancer material and the first dispersion are subjected to the second NP/M for about two minutes to about five minutes, to form the second dispersion (i.e., the "dispersion", as referred to in the broadest embodiment). However, the ordinarily skilled artisan can determine an appropriate mixing time depending on factors such as the components specifically used and/or the energizing means used.

Continuing on with optional steps of the process, a beverage component may then introduced to the dispersion (also referred to herein as second dispersion, in the preferred embodiment), wherein the beverage component comprises an edible acid. Prior to introducing the beverage component to the second dispersion, it is preferred to cease mixing for approximately three to six minutes (the holding period). After this holding period, the beverage component may be introduced to the second dispersion. As with previous usage of the term "introduced to", it is meant that either the beverage component is added to the second dispersion, or the second dispersion is added to the beverage component. Preferably, the beverage component is added to the second dispersion.

The various ingredients suitable for optional (but preferable) use as part of the beverage component are described herein below and include, e.g., additional water, beverage emulsions, thickeners, flavor agents, sweeteners, coloring agents, nutrients, fiber components, and/or carbonation components.

The second dispersion and the beverage component are subjected to a third mixing energy (i.e., the third NP/M), dispersed together over a time period from about one minute to about 1 hour, or both. Thus, the process further comprises dispersing the beverage component with the dispersion (second dispersion) according to a method selected from the group consisting of:

(i) dispersing the beverage component at a NP/M (which may be referred to as the "third NP/M") of from about 20 Watt/Kg to about 75 Watt/Kg;

(ii) dispersing the beverage component over a time period from about one minute to about 1 hour; and (iii) a combination thereof.

The first NP/M, the second NP/M, and the third NP/M may be the same or different and, thus, are each independently chosen. The third mixing energy is from about 20 Watt/Kg to about 75 Watt/Kg. Surprisingly, the present inventors have discovered that wherein the components are subjected to a mixing energy in this range, the final composition is optimally stabilized. This stabilization is measured by the Average Physical Stability Grade the composition exhibits (described below), and/or the viscosity the final composition exhibits (also described below). As the present inventors have discovered, the third mixing energy is preferably from about 30 Watt/Kg to about 60 Watt/Kg, most preferably from about 30 Watt/Kg to about 50 Watt/Kg. Of course, the same (or optionally, different, but preferably the same) energizing means and analytical methods may be used with respect to forming the first dispersion as is described above and in Example 1.

The present inventors have additionally surprisingly discovered that as alternative to this defined mixing energy, or optionally in addition to, the beverage component may be dispersed with the dispersion (second dispersion) slowly, i.e., over a time period from about one minute to about one hour, preferably from about five minutes to about thirty minutes. The present inventors have discovered that utilizing this slow addition rate results in surprisingly enhanced viscosity of the finished composition. For example, wherein the beverage component and dispersion (second dispersion) are dispersed over about a five minute time period, the viscosity of the final composition can be increased approximately 40% relative to dispersing over a time period of about ten seconds. Additionally, wherein the beverage component and dispersion (second dispersion) are dispersed over about a thirty minute time period, the viscosity of the final composition can be increased approximately 90% relative to dispersing over a time period of about ten seconds. Thus, this slow addition further supports the formation of the weak gels formed through the stabilizer system. Surprisingly, the weak three-dimensional gel formed through the stabilizer system is optimized when this slow acidification is used. As a result, the finished composition exhibits an optimized Average Physical Stability Grade, as well as enhanced viscosity.

Thus, according to the present inventive processes, optimized compositions are formed by dispersing the beverage component at a NP/M of from about 20 Watt/Kg to about 75 Watt/Kg; dispersing the beverage component over a time period from about one minutes to about one hour; or a combination of these two methods. Preferably, the beverage component is dispersed at a NP/IM of from about 20 Watt/Kg to about 75 Watt/Kg. Also preferably, a combination of these methods is utilized.

Composition Examples

The following are non-limiting examples of compositions used in accordance with the present invention. The compositions are prepared utilizing conventional methods, in accordance with the procedures described above, or in accordance with the methods outlined for each example as set forth below. The following examples are provided to illustrate the invention and are not intended to limit the spirit or scope thereof in any manner.

Composition Example 1

A ready-to-drink orange juice beverage composition is prepared utilizing the following components:

| Component | Amount (wt %) |
|---|---|
| Titanium Dioxide | 0.009 |
| Sodium Alginate | 0.029 |
| Pectin | 0.011 |
| Carboxymethylcellulose | 0.02 |
| Sodium Hexametaphosphate | 0.1 |
| Potassium Sorbate | 0.03 |
| Citric Acid | 0.45 |
| Sodium Citrate | 0.1 |
| High Fructose Corn Syrup | 14.93 |
| Juice Concentrate | 1.3 |
| Water | Quantum satis |

Composition Example 2

A ready-to-drink orange juice beverage composition is prepared utilizing the following components:

| Component | Amount (wt %) |
|---|---|
| Titanium Dioxide | 0.009 |
| Sodium Alginate | 0.029 |
| Pectin | 0.011 |
| Carboxymethylcellulose | 0.05 |
| Sodium Hexametaphosphate | 0.1 |
| Potassium Sorbate | 0.03 |
| Citric Acid | 0.45 |
| Sodium Citrate | 0.1 |
| High Fructose Corn Syrup | 12 |
| Juice Concentrate | 1.3 |
| Water | Quantum satis |

What is claimed is:

1. A composition comprising:
 (a) a stabilizer system comprising a pectin compound and an alginate compound wherein the alginate compound has a ratio of mannuronic acid units to guluronic acid units of from about 0.1 to about 0.9; and
 (b) a cellulose compound.

2. A composition according to claim 1 further comprising at least one enhancer material selected from the group consisting of vitamins, minerals, oils, and opacifiers.

3. A composition according to claim 2 wherein the cellulose compound is selected from the group consisting of carboxymethylcellulose, methylcellulose, hydroxyethylcellulose, and hydroxypropylcellulose.

4. A composition according to claim 3 wherein the cellulose compound is carboxymethylcellulose.

5. A composition according to claim 4 wherein the pectin compound is a non-amidated pectin.

6. A composition according to claim 5 wherein the pectin compound is a highly methylated non-amidated pectin.

7. A composition according to claim 6 wherein at least one enhancer material is selected from the group consisting of ferric pyrophosphate and titanium dioxide.

8. A composition according to claim 7 wherein the alginate compound has a ratio of mannuronic acid units to guluronic acid units is from about 0.1 to about 0.5.

9. A composition according to claim 8 wherein the ratio of the pectin compound to the alginate compound is from about 0.1 to about 0.9.

10. A composition according to claim 9 wherein at least one enhancer material is titanium dioxide.

11. A composition according to claim 9 comprising from about 0.01% to about 0.2% of the pectin compound and the alginate compound, by weight of the composition.

12. A composition according to claim 11 comprising from about 0.01% to about 0.2% of the cellulose compound, by weight of the composition.

13. A composition according to claim 12 wherein at least one enhancer material is titanium dioxide.

14. A composition according to claim 12 wherein at least one enhancer material is ferric pyrophosphate.

15. A composition according to claim 12 wherein the ratio of the pectin compound to the alginate compound is from about 0.1 to about 0.4.

16. A composition according to claim 15 wherein the ratio of the pectin compound to the alginate compound is from about 0.2 to about 0.4.

17. A composition according to claim 16 comprising from about 0.02% to about 0.08% of the pectin compound and the alginate compound, by weight of the composition.

18. A composition according to claim 17 comprising from about 0.04% to about 0.08% of the pectin compound and the alginate compound, by weight of the composition.

19. A composition according to claim 18 comprising from about 0.02% to about 0.05% of the carboxymethylcellulose, by weight of the composition.

20. A composition according to claim 19 wherein at least one enhancer material is titanium dioxide.

21. A composition according to claim 19 wherein at least one enhancer material is ferric pyrophosphate.

22. A composition according to claim 12 wherein the ratio of the pectin compound to the alginate compound is from about 0.4 to about 0.9 and the composition comprises from about 0.01% to about 0.06% of the pectin compound and the alginate compound, by weight of the composition.

23. A composition according to claim 22 which comprises from about 0.03% to about 0.05% of the pectin compound and the alginate compound, by weight of the composition.

24. A composition according to claim 5 which is a beverage composition further comprising a beverage member selected from the group consisting of water, fruit juice, tea solids, fruit flavors, botanical flavors, and mixtures thereof.

25. A composition according to claim 24 wherein the beverage composition exhibits a pH of from about 2 to about 5.

26. A composition according to claim 25 wherein the beverage composition exhibits a pH of from about 2.7 to about 3.8.

27. A method of stabilizing a product comprising incorporating into the product the composition according to claim 1.

* * * * *